United States Patent
Hori et al.

(10) Patent No.: US 10,670,350 B2
(45) Date of Patent: Jun. 2, 2020

(54) METHOD OF MANUFACTURING HEAT EXCHANGER

(71) Applicant: NIPPON STEEL NISSHIN CO., LTD., Chiyoda-ku, Tokyo (JP)

(72) Inventors: Yoshiaki Hori, Tokyo (JP); Kazunari Imakawa, Tokyo (JP)

(73) Assignee: NIPPON STEEL NISSHIN CO., LTD., Tokyo (JP)

( * ) Notice: Subject to any disclaimer, the term of this patent is extended or adjusted under 35 U.S.C. 154(b) by 0 days.

(21) Appl. No.: 16/219,023

(22) Filed: Dec. 13, 2018

(65) Prior Publication Data

US 2019/0285367 A1  Sep. 19, 2019

Related U.S. Application Data

(63) Continuation of application No. PCT/JP2018/010334, filed on Mar. 15, 2018.

(51) Int. Cl.
*B23K 20/00* (2006.01)
*B23K 37/00* (2006.01)
(Continued)

(52) U.S. Cl.
CPC .............. *F28F 9/18* (2013.01); *B23K 20/02* (2013.01); *B23K 37/00* (2013.01); *C22C 38/00* (2013.01);
(Continued)

(58) Field of Classification Search
CPC ...... C22C 38/00; B23K 20/02; B23K 20/023; B23K 2101/14; B23K 37/0443
See application file for complete search history.

(56) References Cited

U.S. PATENT DOCUMENTS

| 5,387,545 A * | 2/1995 | Kiyota | C30B 31/06 |
| | | | 438/565 |
| 2009/0139646 A1* | 6/2009 | Ohashi | B23K 20/02 |
| | | | 156/273.7 |

(Continued)

FOREIGN PATENT DOCUMENTS

| JP | S53102247 A | 9/1978 |
| JP | H03013283 A | 1/1991 |

(Continued)

OTHER PUBLICATIONS

Extended European Search Report issued in the EP Patent Application No. EP18789306.0, dated Aug. 26, 2019.
Taiwanese Office Action corresponding to Application No. 107110383; dated Sep. 19, 2019.

*Primary Examiner* — Erin B Saad
(74) *Attorney, Agent, or Firm* — Cantor Colburn LLP

(57) ABSTRACT

Provided is a method of manufacturing a heat exchanger by diffusion bonding in which deformation of bonding members as stainless steel plates is suppressed, and releasability (detachability of a bonding member from a release member) after diffusion bonding treatment is excellent. Provided is a method of manufacturing a heat exchanger, the method including layering a plurality of bonding members 1 made of stainless steel, and applying heat and pressure to effect diffusion bonding of the bonding members 1, in which release members 3 are arranged on the both surface sides of the bonding members 1, and holding jigs 4 are arranged so as to sandwich the bonding members 1 through the release members 3, and pressing is then performed through the holding jigs 4 with a pressure device, and in which the diffusion bonding is performed using a combination of the release members 3 and the bonding members 1, the release members 3 including a steel material containing 1.5 mass % or more of Si, and a ratio (Fr/Fp) of the high-temperature (Continued)

strength (Fr) of the release members 3 at 1000° C. to the high-temperature strength (Fp) of the bonding members 1 at 1000° C. being 0.9 or more.

8 Claims, 3 Drawing Sheets

(51) Int. Cl.
    *F28F 9/18*     (2006.01)
    *F28F 3/00*     (2006.01)
    *F28F 21/08*     (2006.01)
    *C22C 38/00*     (2006.01)
    *B23K 20/02*     (2006.01)

(52) U.S. Cl.
    CPC .............. *F28F 3/00* (2013.01); *F28F 21/083* (2013.01); *F28F 21/089* (2013.01); *F28F 2275/02* (2013.01); *F28F 2275/061* (2013.01)

(56) References Cited

U.S. PATENT DOCUMENTS

| | | | | |
|---|---|---|---|---|
| 2014/0299582 | A1* | 10/2014 | Mizuno ................. | B23K 20/02 |
| | | | | 219/78.02 |
| 2015/0258724 | A1* | 9/2015 | Honma ................ | C23C 18/1806 |
| | | | | 425/449 |
| 2018/0090413 | A1 | 3/2018 | Terasaki et al. | |

FOREIGN PATENT DOCUMENTS

| | | |
|---|---|---|
| JP | 2000326077 A | 11/2000 |
| JP | 2010085094 A | 4/2010 |
| JP | 2014128815 A | 7/2014 |
| JP | 2014190664 A | 10/2014 |
| JP | 2015152283 A | 8/2015 |
| TW | 201701975 A | 1/2017 |

\* cited by examiner

METHOD OF MANUFACTURING HEAT EXCHANGER

CROSS REFERENCE TO RELATED APPLICATIONS

This application is a continuation under 35 U.S.C. § 120 of PCT/JP2018/010334, filed on Mar. 15, 2018, the disclosures all of which is also incorporated herein by reference.

TECHNICAL FIELD

The present invention relates to a method of manufacturing a heat exchanger by diffusion bonding.

BACKGROUND ART

There are various types of heat exchangers. Among these, plate-type heat exchangers (flat-plate heat exchangers), which have high heat exchanging performance and can easily be installed and maintained, are widely used for electric water heaters, industrial equipment, car air-conditioners, and the like. A plate-type heat exchanger has a plurality of layered thin metal plates configured so that paths for high- and low-temperature media are formed alternately and adjacently between the layered plates to allow for heat exchange between the high- and low-temperature media through each plate.

As methods of assembling a plurality of plates in a layered manner, Patent Document 1 describes, for example, bonding methods such as tightening with a gasket and a screw, welding, and brazing. For small-to-medium sized heat exchangers, bonding operations are often performed by brazing in view of pressure resistance. However, attempts for layering and bonding corrugated plates by brazing may result in bonding defects inherent to braze materials, such as erosion occurring upon bonding, cracks in brazed portions, and buried flow paths with a braze melt.

Accordingly, use of the diffusion bonding method has been considered for substituting for the brazing method. Diffusion bonding is a bonding method which takes advantage of interdiffusion of atoms of a base material occurring at a bonding interface at high temperature and high pressure under vacuum or an inert atmosphere. A diffusion bonded region can be obtained having such strength and corrosion resistance comparable to those of the base material.

Diffusion bonding is performed by layering and pressing bonding members with a pressurizing means, and maintaining the pressurized state for a predetermined period of time. A release member such as a cover plate and a spacer may be sandwiched between a bonding member and a pressurizing means when diffusion bonding is performed. Such a release member may be made of a carbon material because thermal resistance and anti-breakage properties are required at a temperature during diffusion bonding. For example, Patent Document 2 describes a means for diffusion bonding in which an elastic carbon sheet is used.

Patent Document 1: Japanese Unexamined Patent Application, Publication No. 2010-85094
Patent Document 2: Japanese Unexamined Patent Application, Publication No. 2014-128815

DISCLOSURE OF THE INVENTION

Problems to be Solved by the Invention

Meanwhile, a stainless steel plate, which has excellent corrosion resistance, is used as a metal plate in view of improved durability of a heat exchanger. When stainless-steel plate members are layered and diffusion bonded using release members including carbon which are arranged adjacent to the plate members, stainless steel may react with carbon. This may complicate release of a release member from a plate member after the completion of diffusion bonding treatment, resulting in decreased releasability of the both members. Disadvantageously, the corrosion resistance of plate members may also be decreased due to carburization in which carbon permeates into stainless steel, or the surface roughness of plate members may be increased, resulting in deteriorated surface texture.

Further, plates as bonding members are maintained at high pressure and high temperature because diffusion bonding requires the bonding members to be pressurized and heated with a hot press apparatus and the like. Moreover, a plate member for forming a flow path in the main body of a heat exchanger has a portion of a non-bonded surface at the side of the flow path, and thus has a relatively small degree of constraint by the surroundings as compared with other plate members (see FIG. 3A). Therefore, heat-deformation may occur in which a plate member is expanded toward the side of a flow path at the portion of the non-bonded surface by heating in diffusion bonding treatment, for example, as shown in FIG. 3B. Disadvantageously, the deformed portion may not be able to return to the original state even upon having cooled after the completion of diffusion bonding treatment, depending on the extent of the heat expansion.

The present invention is made in order to solve the aforementioned problems. An object of the present invention is to provide a method of manufacturing a heat exchanger by diffusion bonding in which deformation of bonding members is suppressed while maintaining diffusion bonding properties even when the bonding members include stainless steel plates, and in which releasability (detachability of a bonding member from a release member) after diffusion bonding treatment is excellent.

Means for Solving the Problems

The present inventors focused on materials and properties of a release member which makes direct contact with a bonding member (plate member). The present inventors found that the above object can be achieved by selecting a material which does not react with stainless steel contained in a bonding member as a constituent material of a release member, and further selecting materials of the bonding member and the release member so that a combination of their properties is suitable for suppressing deformation after diffusion bonding. Then, the present invention has been completed. Specifically, the present invention can provide the following.

(1) An embodiment of the present invention provides a method of manufacturing a heat exchanger, the method including layering a plurality of bonding members made of stainless steel, and applying heat and pressure to effect diffusion bonding of the bonding members, in which release members are arranged on the both surface sides of the bonding members, and holding jigs are arranged so as to sandwich the bonding members through the release members, and pressing is then performed through the holding jigs with a pressure device, and in which the diffusion bonding is performed using a combination of the release members and the bonding members, the release members including a steel material containing 1.5 mass % or more of Si, the ratio (Fr/Fp) of the high-temperature strength (Fr) of the release members at 1000° C. to the high-temperature strength (Fp) of the bonding members at 1000° C. being 0.9 or more.

(2) Another embodiment of the present invention provides the method of manufacturing a heat exchanger according to (1), in which an average cooling rate after heating in the diffusion bonding is less than 1.2° C./min.

(3) Still another embodiment of the present invention provides the method of manufacturing a heat exchanger according to (1) or (2), in which the holding jigs include a carbon material.

(4) Yet another embodiment of the present invention provides the method of manufacturing a heat exchanger according to any one of (1) to (3), in which a parting agent is applied to the both sides of the release members.

Effects of the Invention

An embodiment of the present invention can provide a method of manufacturing a heat exchanger by diffusion bonding, in which use of a combination of bonding members and release members having the aforementioned configurations in terms of ingredient compositions, high-temperature strengths, and thermal expansion coefficients can suppress deformation of the bonding members while maintaining diffusion bonding properties even when the bonding members include stainless steel plates, and can provide excellent releasability after diffusion bonding treatment.

BRIEF DESCRIPTION OF THE DRAWINGS

FIG. 3A a test assembly before diffusion bonding, and FIG. 3B deformed plate members after diffusion bonding.

PREFERRED MODE FOR CARRYING OUT THE INVENTION

Below, the embodiments of the present invention will be described. The present invention shall not be limited to these descriptions.

The present embodiment relates to a method of manufacturing a heat exchanger, the method including layering a plurality of bonding members made of stainless steel, and applying heat and pressure to effect diffusion bonding of the bonding members. Release members are arranged on the both sides of the bonding members, and holding jigs are arranged so as to sandwich the bonding members through the release members, and pressing is then performed through the holding jigs with a pressure device to allow plate members as the bonding members to be diffusion bonded, thereby manufacturing a heat exchanger.

(Bonding Member)

Figure 1:
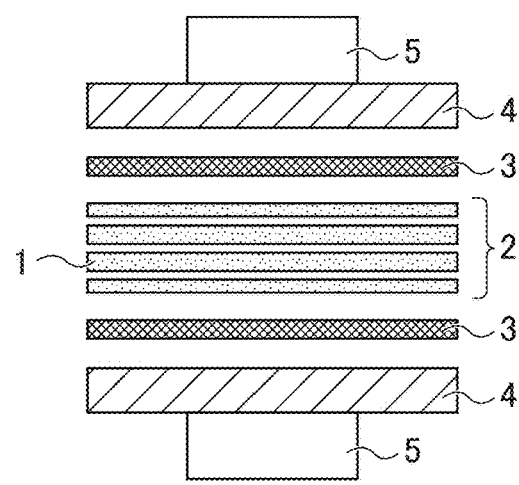
FIG. 1 schematically illustrates an embodiment of bonding members placed in a hot press apparatus.

FIG. 1 shows the overview of bonding members to be subjected to diffusion bonding treatment. As an apparatus for performing diffusion bonding, a hot press apparatus may be used which can apply heat and pressure under a predetermined atmosphere. Bonding members (plate members) to be diffusion bonded are prepared as a laminate in which a plurality of plate members are layered, and loaded into a pressuring and heating apparatus. Then, release members are arranged so as to make contact with the both sides of the laminate. FIG. 1 shows an example of a plate laminate 2 in which four plate members 1 are layered. Inside a pressuring and heating apparatus, holding jigs 4 are each arranged so as to make contact with one of two release members 3 arranged on the outer sides of the plate laminates 2. The holding jigs 4 are each connected to a pressurizing shaft 5 of a pressure device. When a pressurizing mechanism (not shown) is actuated, the plate laminate 2 is pressed by the holding jigs 4 in a sandwiched manner through the pressurizing shaft 5 to allow a predetermined pressure to be applied to the plate members 1, and this pressurized state is maintained for a predetermined period of time. The plate laminate 2 including the bonding members are heated and pressurized under predetermined conditions to effect diffusion bonding of the plate members 1 in the inside of the pressuring and heating apparatus where vacuum or an inert atmosphere is maintained. It is noted that the number of plate members is not limited to four. A plurality of plate laminates may be used to prepare an assembly in which a release member is arranged between the respective plate laminates, and the assembly may be then bonded. Note that the inner two of the plate members 1 have a larger thickness than the outer two of them in order to form a flow path (not shown) with the inner two as shown in FIG. 1. Further, the combination of flow paths shall not be limited to the configuration shown in FIG. 1.

The pressure device may simply include a pressurizing mechanism such as servo, spring, and weight. A parting agent may be applied on a surface of a release member before diffusion bonding so that the release member can be easily removed from a bonding member after diffusion bonding.

In a heat exchanger having a plurality of layered plate members, a fluid passes through narrow flow paths formed by the plate members to allow for heat exchange between a high- and low-temperature fluid through each plate member. Therefore, the plate members need to have good mechanical strength (high-temperature strength) and corrosion resistance at a high-temperature range. In view of the above, stainless steel, which is excellent in thermal resistance and durability, is used for plate members in the present embodiment. Further, plate members are preferably configured to be in a form of a thin plate in order to enhance heat exchanging performance.

(Release Member)

In the present embodiment, a release member including a steel material having 1.5 mass % or more of Si is preferably used. A release member, which will be placed on a bonding member, and exposed to high temperature and pressure during diffusion bonding, is required, for example, to show less significant breakage and corrosion at a high temperature, and not to react with the bonding member. A release member according to the present embodiment preferably includes a steel material having a large content of Si in view of suppressed reactions with a bonding member.

(Si Content)

The release member according to the present embodiment includes a steel material having 1.5 mass % or more of Si. Si is an easily-oxidizable element, and thus may form a robust oxide film on a surface of a release member. The base material of the release member is brought into contact with a bonding member through the Si oxide film. This can inhibit a reaction at the interface between the release member and the bonding member. Formation of the Si oxide film can suppress adhesion and interface reactions between these members, and thus the release member can be easily removed from the bonding member with small releasing force after the completion of diffusion bonding treatment. The aforementioned Si oxide film can also inhibit permeation of ingredients of the release member into the inside of the bonding member, allowing good thermal and corrosion resistance of stainless steel in the bonding member to be maintained, and also allowing a smooth surface texture to be maintained. In view of the above, the release member preferably includes a steel material having 1.5 mass % or more of Si.

Even when a Si oxide film is formed on a surface of a release member, the Si oxide film may be partially destroyed due to excessive change in the shape of the release member induced by an external load, thermal expansion or contraction, and the like. If this occurs, a portion of the release member may be brought into contact with a bonding member not through the oxide film, resulting in decreased releasability of these members. In view of the above, a release member preferably includes a steel material containing Si at a certain level or higher to allow a stable and robust oxide film to be formed.

Considering mechanical strength and corrosion resistance under high-temperature environments, austenite-based stainless steel materials, which have excellent thermal resistance, durability, shapability, and the like, are suitable for a material of the release member according to the present embodiment. Specifically, steel materials having the following compositions can be used.

(1) A stainless steel material including C: 0.1 mass % or less, Si: 1.5 to 5.0 mass %, Mn: 2.5 mass % or less, P: 0.06 mass % or less, S: 0.02 mass % or less, Ni: 8.0 to 15.0 mass %, Cr: 13.0 to 23.0 mass %, N: 0.2 mass % or less.

(2) A stainless steel material including one or more selected from the group consisting of Mo: 3.0 mass % or less, Cu: 4.0 mass % or less, Nb: 0.8 mass % or less, Ti: 0.5 mass % or less, V: 1.0 mass % or less, and B: 0.02 mass % or less in addition to the composition of (1).

(3) A stainless steel material including one or more selected from the group consisting of Al: 0.2 mass % or less, REM: 0.2 mass % or less, Y: 0.2 mass % or less, Ca: 0.1 mass % or less, and Mg: 0.1 mass % or less in addition to the composition of (1) or (2).

The ingredients of the above stainless steel materials will be described.

C can improve the strength and hardness of steel by enhancing solid solution. However, a larger content of C may reduce the processability and toughness of steel. Therefore, the content of C is preferably 0.1 mass % or less.

Si, which is blended to allow for formation of a robust oxide film on a surface of a release member as described above, is preferably included in an amount of 1.5 mass % or more. Formation of a Si oxide film can inhibit a reaction at an interface between a release member and a bonding member, and thus the release member can be easily removed from the bonding member with small releasing force after diffusion bonding. The Si oxide film can also inhibit permeation of ingredients of the release member into the inside of the bonding member, allowing good thermal and corrosion resistance of the bonding member to be maintained, and also allowing a smooth surface texture to be maintained. When the content of Si is less than 1.5 mass %, the aforementioned effects obtained from formation of an oxide film can not fully be obtained. It is noted that addition of more than 5.0 mass % may substantially saturate the aforementioned effects, and can no longer provide appropriate processability due to hardening. Therefore, the content is preferably 5.0 mass % or less.

Mn is an element which may improve high-temperature oxidation properties. An excess content may reduce processability due to work-hardening. Therefore, the content of Mn is preferably 2.5 mass or less.

Cr is an element which may form a passive-state coating to confer corrosion resistance, leading to improved corrosion resistance. A content of less than 13.0 mass % can not sufficiently provide the effects therefrom. A content of more than 23.0 mass % may reduce processability. Therefore, the content of Cr is preferably 13.0 to 23.0 mass %.

Ni is an essential element for stabilizing an austenite phase to maintain corrosion resistance, and is also effective for processability. A content of less than 8.0 mass % can not sufficiently provide these effects while a content of more than 15.0 mass % may saturate these effects. Therefore, the content of Ni is preferably 8.0 to 15.0 mass %.

P and S may be present as unavoidable impurities. The contents of these are preferably as low as possible within a range where processability and material properties are not deteriorated. The content of P is preferably 0.06 mass % or less, and the content of S is preferably 0.02 mass % or less.

N is effective as an austenite-stabilizing element, and can further improve high-temperature strength and corrosion resistance of stainless steel along with Cr and Ni. However, excessive addition may reduce manufacturability. Therefore, the content of N is preferably 0.2 mass % or less.

Mo and Cu are elements which can contribute to improvement in high-temperature strength and corrosion-resistance. The contents of Mo and Cu are both preferably 0.02 mass % or more. However, when the content of Mo is excessive, a ferrite phase may be formed, resulting in reduced processability. Therefore, the content of Mo is preferably 3.0 mass % or less. An excessive content of Cu may be responsible for decreased hot workability. Therefore, the content of Cu is preferably 4.0 mass % or less.

Nb, Ti, and V are effective for improving high-temperature strength. The content of Nb is preferably 0.01 mass % or more, the content of Ti is preferably 0.01 mass % or more, and the content of V is preferably 0.01 mass % or more. On the other hand, when these elements are included in excess amounts, processability may be reduced. Therefore, the content of Nb is preferably 0.8 mass % or less, the content of Ti is preferably 0.5 mass % or less, and the content of V is preferably 1.0 mass % or less.

B is an element which can improve hot workability. The content of B is preferably 0.0002 mass % or more. On the other hand, excessive addition may promote precipitation of borides, resulting in decreased processability. Therefore the content of B is preferably 0.02 mass % or less.

One or more selected from the group consisting of Mo, Cu, Nb, Ti, V, and B may be added.

Al, REM (rare earth element), Y, Ca, and Mg are effective for improving high-temperature oxidation resistance, and one or more selected from these elements may be added. The content of Al is preferably 0.001 mass % or more, the content of REM is preferably 0.001 mass % or more, the content of Y is preferably 0.0002 mass % or more, the content of Ca is preferably 0.0002 mass % or more, and the content of Mg is preferably 0.0002 mass % or more. However, excessive contents of these elements may reduce processability. Therefore, the content of Al is preferably 0.2 mass % or less, the content of REM is preferably 0.2 mass % or less, the content of Y is preferably 0.2 mass % or less, the content of Ca is preferably 0.1 mass % or less, and the content of Mg is preferably 0.1 mass % or less.

The shape of a release member is appropriately selected depending on the shape of a bonding member. A plate member for a plate-type heat exchanger is generally plate-like. Accordingly, a release member arranged in contact with it is used as a release plate. The plate thickness of a release member is preferably 2 to 10 mm, more preferably 3 to 8 mm.

(Ratio of High-Temperature Strengths)

Further, in the present embodiment, diffusion bonding is preferably performed using a combination of a release member and a bonding member, the ratio (Fr/Fp) of the high-temperature strength (Fr) of the release member at 1000° C. to the high-temperature strength (Fp) of the bonding member at 1000° C. being 0.9 or more.

A release member, which is sandwiched between a holding jig and a bonding member, and exposed to high pressure and temperature during diffusion bonding, may undergo deformation if the high-temperature strength of the release member is low. Deformation of the release member may deteriorate uniform pressurization of the bonding member with which the release member makes contact, resulting in a faulty bonding region. Accordingly, in the present embodiment, release members are studied for their high-temperature properties in terms of high-temperature strength at 1000° C. which corresponds to a standard treatment temperature during diffusion bonding.

Specifically, they are evaluated based on the ratio (Fr/Fp) of the high-temperature strength (Fr) of a release member at 1000° C. to the high-temperature strength (Fp) of a bonding member at 1000° C. A release member preferably includes a steel material having a ratio (Fr/Fp) of high-temperature strengths at 1000° C. of 0.9 or more. When the high-temperature strength of a release member is less than 0.9 relative to that of a bonding member, the release member may undergo excessive deformation when pressurized with holding jigs. Deformation of a release member may result in deformation of a bonding member due to non-uniform pressurization of the bonding member. Therefore, in view of suppressing deformation, a combination of a release member and a bonding member is preferably used in which the ratio of high-temperature strengths is 0.9 or more, more preferably 1.0 or more.

(Ratio of Thermal Expansion Coefficients)

A combination of a release member and a bonding member is preferably used in which the ratio (Tr/Tp) of a thermal expansion coefficient (Tr) of the release member to a thermal expansion coefficient (Tp) of a bonding member at 30° C. to 1000° C. is 0.90 to 1.60. A bonding member and a release member are both expanded thermally upon heating to undergo elastic deformation. When the degree of thermal expansion is different between these members, mutual constraint due to their deformations may induce accumulated strain, resulting in plastic deformation depending on the amount of strain.

In particular, a bonding member which participates in forming a flow path of a heat medium (hollow portion) in a heat exchanger may be in contact with a release member at one surface side while it may also have a portion which can be a non-bonding surface at the opposite surface side. A portion in which bonding surfaces of bonding members are overlapped is constrained by the surroundings, but the aforementioned hollow portion is not constrained by the surroundings. This may result in occurrence of elastic deformation due to thermal expansion (see FIG. 3B). Excessive elastic deformation may, in turn, result in plastic deformation, and returning to the original shape may become difficult.

When a release member having a small ratio of high-temperature strengths is used, the deformation resistance of the release member is smaller as compared with a plate member. Therefore, the thermal expansion coefficient of the bonding member is preferably comparable with that of the release member. In the present embodiment, this thermal property can be evaluated based on the ratio (Tr/Tp) of a thermal expansion coefficient (Tr) of a release member to a thermal expansion coefficient (Tp) of a bonding member. When a release member having a small ratio of high-temperature strengths, the above thermal expansion coefficient ratio (Tp/Tr) is preferably 1.0±5%, that is, 0.95 to 1.05.

(Average Cooling Rate)

The average cooling rate after heating in diffusion bonding is preferably less than 1.2° C./min. A bonding member and a release member undergo thermal expansion during diffusion bonding, and undergo thermal contraction in a cooling step after diffusion bonding to return to their original shapes. When the degree of thermal expansion is different between the release member and the bonding member, mutual constraint of their contractive changes during cooling may induce accumulated strain. When these contractive changes reach an excessively large magnitude, plastic deformation may occur. Accordingly, in the present embodiment, we focused on the average cooling rate after the completion of diffusion bonding. When treatment is performed at an average cooling rate of less than 1.2° C./min, the amount of residual deformation after cooling can be reduced. A cooling rate faster than that is not preferred because thermal contractive changes may be larger, resulting in a larger amount of residual deformation after cooling. The above average cooling rate may simply be controlled in a temperature range from a holding temperature during diffusion bonding to about 400° C.

(Holding Jig)

A holding jig refers to a member which is connected to a pressurizing mechanism of a pressure device, and transmits pressing force to a bonding member. Preferably, a holding jig includes a carbon material because it is required to be thermally resistant and not to be damaged at a temperature during diffusion bonding.

(Parting Agent)

In an embodiment of the present invention, a parting agent is preferably applied on the both sides of a release member. For example, boron nitride-based sprays such as hexagonal boron nitride powder (h-BN) can be used. The coating thickness of a parting agent may simply be 3 times or more (about 10 μm) of the average particle size (for example, about 3 μm) of the powder of the parting agent.

EXAMPLES

Below, Examples of the present invention will be described. The present invention shall not be limited to the following Examples, and modifications may be made appropriately.

(Production of Test Sheets)

Steel materials No. 1 to No. 9 having ingredient compositions shown in Table 1 were each ingoted in a 30-kg vacuum melting furnace, and the resulting steel ingots were each forged into a sheet having a thickness of 30 mm. Subsequently, hot rolling was performed at 1200° C. to produce a hot-rolled sheet having a thickness of 6 mm, and soaking annealing was then performed at 1100° C. for 60 seconds to obtain a hot-rolled and annealed sheet. The hot-rolled and annealed sheet was cold-rolled into a sheet having a thickness of 3.0 mm, and final annealing was then performed by 30-second soaking at 1100° C. to obtain a final finish sheet having a thickness of 3 mm. Then, surface-finish treatment was performed according to 2B finishing or 2D finishing to obtain a cold-rolled and annealed sheet. The steel materials No. 5 and No. 6 used for producing plates were further subjected to cold rolling and annealing for adjusting the final finish sheet thicknesses into 0.4 mm and 1.0 mm, respectively. Then surface-finish treatment was performed according to 2B or 2D finishing to obtain cold-rolled and annealed materials. Test sheets with dimensions of 210 mm×160 mm were cut out of the above cold-rolled and annealed sheets. These test sheets were used for testing bonding members or release members. The remainders of each of the ingredient compositions shown in Table 1 are Fe and unavoidable impurities.

The steel materials No. 1 to No. 5 are of austenite-based stainless steel. The steel materials No. 6 to No. 9 are of ferrite-based stainless steel.

expansion of a test piece in the test was measured to compute a thermal expansion coefficient (α30-1000° C.) from 30° C. to 1000° C. Measurement results are shown in Table 1 (unit: ×10$^{-6}$/° C.).

(Bonding Test)

A test assembly was produced by combining four test sheets of bonding members (plate members) with one test sheet of a release member (release plate). As shown in Table 2, the four test sheets as plate members were of the steel material No. 5 in this test. Two test sheets (thickness: 1.0 mm/sheet) as plate members each having an opening serving as a flow path were layered, and two plate members (thickness: 0.4 mm/plate) as heat exchanger plates having no opening serving as a flow path were then arranged so as to sandwich the above layered two test sheets. Then, a test sheet as a release member having a thickness of 3.0 mm was then arranged in a layered manner. The test sheet was one of the steel materials No. 1 to No. 5. Holding jigs made of

TABLE 1

|  | Steel material No. | Ingredients(mass %) | | | | | | | | | |
|---|---|---|---|---|---|---|---|---|---|---|---|
|  |  | C | Si | Mn | P | S | Ni | Cr | Cu | Mo | Al | Ti |
| Present inventive examples | 1 | 0.060 | 1.66 | 0.96 | 0.022 | 0.001 | 10.86 | 19.82 | 0.10 | 0.06 | 0.030 | — |
|  | 2 | 0.042 | 3.22 | 0.78 | 0.027 | 0.001 | 13.20 | 19.20 | 0.18 | 0.07 | 0.020 | — |
|  | 3 | 0.051 | 2.12 | 0.81 | 0.019 | 0.001 | 11.80 | 18.43 | 0.20 | 0.09 | 0.024 | 0.06 |
| Comparative Example | 4 | 0.022 | 1.38 | 0.77 | 0.025 | 0.002 | 12.96 | 19.17 | 0.19 | 0.96 | 0.018 | — |
|  | 5 | 0.020 | 0.60 | 1.00 | 0.020 | 0.001 | 10.10 | 16.70 | 0.30 | 2.04 | 0.022 | — |
|  | 6 | 0.010 | 0.31 | 0.97 | 0.018 | 0.001 | 0.18 | 18.32 | 0.21 | 1.85 | 0.006 | — |
|  | 7 | 0.011 | 0.92 | 1.10 | 0.017 | 0.001 | 0.14 | 14.02 | 0.16 | 0.02 | 0.003 | — |
|  | 8 | 0.009 | 0.32 | 0.28 | 0.023 | 0.004 | 0.15 | 18.10 | 0.46 | — | 0.003 | — |
|  | 9 | 0.010 | 0.56 | 0.23 | 0.030 | 0.001 | 0.19 | 18.10 | 0.09 | 0.03 | 3.200 | 0.15 |

|  | Steel material No. | Ingredients(mass %) | | | High-temperature strength (F.) (MPa) | Thermal expansion coefficient (T) (×10$^{-4}$/° C.) |
|---|---|---|---|---|---|---|
|  |  | Nb | Others | N | | |
| Present inventive examples | 1 | 0.10 | Ca: 0.001 La: 0.012 Ce: 0.030 | 0.133 | 43 | 19.4 |
|  | 2 | 0.09 | Mg: 0.008 B: 0.0014 | 0.014 | 34 | 19.0 |
|  | 3 | — | V: 0.11 Y: 0.009 | 0.089 | 38 | 19.3 |
| Comparative Example | 4 | 0.11 | B: 0.0022 | 0.102 | 40 | 19.6 |
|  | 5 | — | — | 0.018 | 32 | 19.9 |
|  | 6 | 0.39 | — | 0.010 | 12 | 12.9 |
|  | 7 | 0.35 | — | 0.009 | 10 | 13.5 |
|  | 8 | 0.41 | V: 0.06 | 0.014 | 11 | 13.1 |
|  | 9 | — | B: 0.0012 | 0.007 | 8 | 13.0 |

(Measurement of High-Temperature Strength)

The test sheets obtained were subjected to high-temperature tensile tests with a strain rate of 0.3%/min at a temperature of 1000° C. in accordance with JIS G 0567 to measure values of 0.2% proof stress. These measured values were considered herein as values of high-temperature strength at 1000° C. The measurement results are shown in Table 1 (unit: MPa). Then, the ratios (Fr/Fp) of the high temperature strength (Fr) of a release member to the high temperature strength (Fp) of a bonding member were computed based on the measured values. Results are shown in Table 2.

(Measurement of Thermal Expansion Coefficients)

The test sheets obtained were heated from 30° C. to 1000° C. at a heating rate of 1° C./second with a differential dilatometer (an infrared-heating thermal-expansion measurement apparatus (TMA), standard sample: quartz, Rigaku Corporation) in accordance with JIS Z 2285. The amount of carbon were used. Hexagonal boron nitride powder (boron spray, YK Inoas Co., Ltd.) as a parting agent was applied on the both sides of the release member. The above test assembly was subjected to diffusion bonding treatment under the following pressurizing and heating conditions in a hot press apparatus.

Atmosphere: an initial degree of vacuum of 1×10$^{-2}$ Pa or less

Bonding temperature: 1080° C.

Heating time: from ordinary temperature to bonding temperature in about 2 hours.

Soaking (bonding) time: 3 hours

Average cooling rate: from 1080° C. to 400° C. at 3.2° C./min (Pattern A) or 1.1° C./min (Pattern B).

Pressing pressure: surface pressure of 2 MPa

Figure 2:
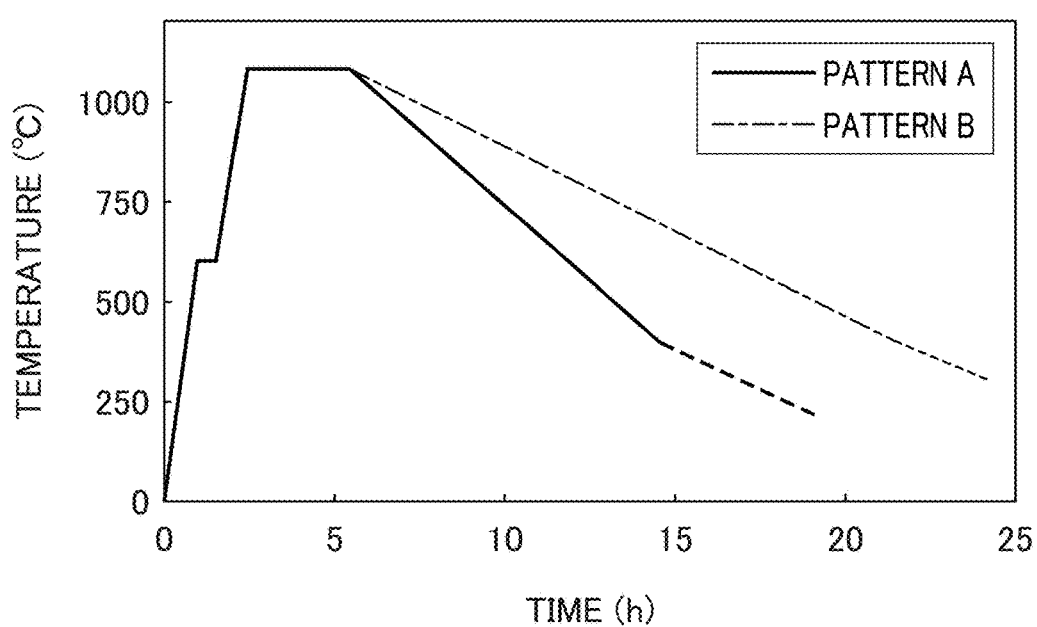
FIG. 2 shows patterns of heating and cooling in diffusion bonding treatment used in Examples.

Heating and cooling patterns used for the aforementioned diffusion bonding treatment are shown in FIG. 2. Patterns A and B shown in FIG. 2 represent the two patterns as described above with different average cooling rates. After being cooled to ordinary temperature, the test assembly was removed from the hot press apparatus, and the following evaluation tests were performed for deformation suppressibility and releasability.

(Evaluation of Deformation Suppressibility)

Figure 3A:
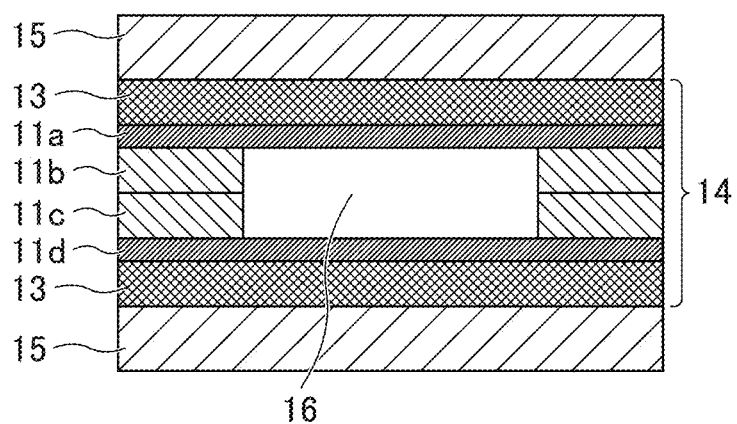
FIG. 3A and FIG. 3B schematically illustrate a method of measuring the amount of deformation according to Examples.
Figure 3B:
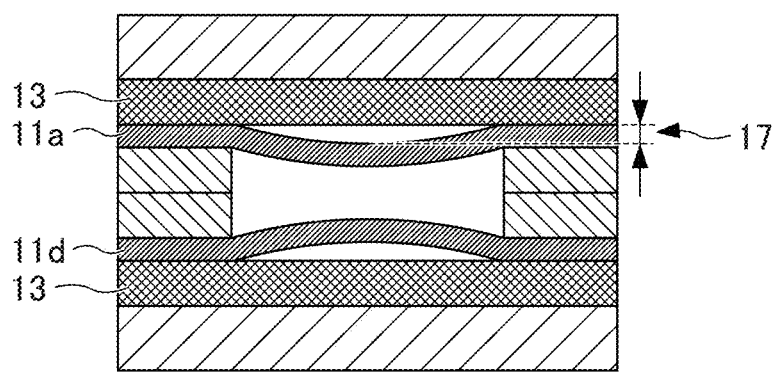

Deformation suppressibility was evaluated based on the amount of deformation of diffusion-bonded plate members. An approach of measuring the amount of deformation will be described. FIG. 3A & FIG. 3B schematically show[s] a cross section of the test assembly. FIG. 3A shows a state before diffusion bonding, in which a test assembly 14 having a combination of four plate members 11a to 11d and two release plates 13 is sandwiched by carbon holding jigs 15, and is ready for pressurization. FIG. 3B shows a state of the test assembly 14 after diffusion bonding. After diffusion bonding, the plate members 11a and 11d facing a cavity portion 16 in the test assembly 14, which are constrained by the release plate 3 and the other plate members 11b and 11c at portions other than those facing to the cavity portion, expand upon heating to undergo deformation such that they bend toward the cavity portion. These will remain in a bent shape unless they return to the original shape by virtue of contractive changes during cooling. Heights 17 at locations that showed the largest deformation from the surface of the plate member 11a or 11d in contact with the release plate 3 were measured. Among these, the largest value was used. In the present specification, this value is referred to as the amount of deformation of a plate member. The state of deformation after diffusion bonding was evaluated based on the amount of deformation defined as described above. The height 17 was measured with a Comus high-speed three-dimensional shape measurement system. Deformation suppressibility was evaluated as follows: good (A) when the amount of deformation is less than 30 μm; fair (B) when it is 30 μm to 50 μm; and bad (C) when it is more than 50

(Evaluation of Releasability)

Figure 4:
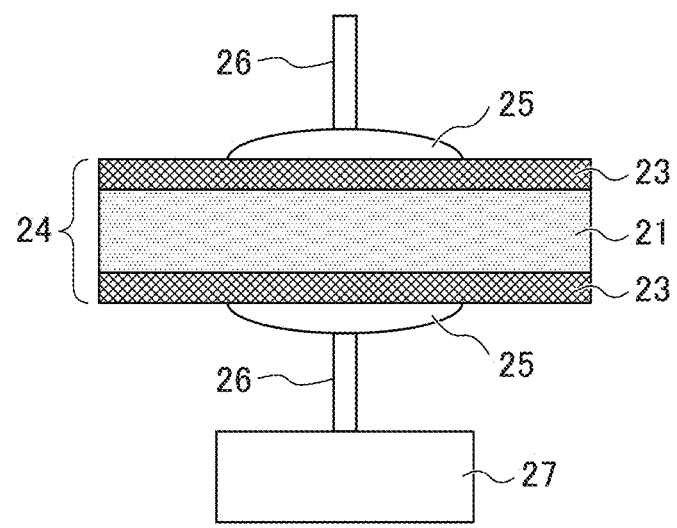
FIG. 4 schematically illustrates a method of measuring releasability used in Examples.

A test assembly was used to evaluate releasability after bonding. To this end, release of release plates from a plate member was tested. The overview is shown in FIG. 4. A tension unit (not shown) and two jigs each having a suction cup 25 attached to an end of a wire 26 were prepared. The suction cups 25 of the jigs were attached to the surfaces of the two release plates 23 of the test assembly 24 after diffusion bonding. A weight 27 having a predetermined weight was connected to the wire 26 of one of the jigs, and then the wire 26 of the other jig was pulled up with the tension unit. Whether the release members 23 were successfully released from the plate member 21 or not was visually determined when the test assembly 24 was pulled from the both sides with force corresponding to the weight of the weight 27. Tests were performed in a similar way with varied weights of the weight 27. A plate member and a release plate after diffusion bonding are preferably released with small force. Therefore, evaluation criteria were as follows. Releasability was evaluated as good (A) when the release plates were released from the plate member with a weight of 5 kg or less. Releasability was evaluated as slightly poor (B) when the release plates were released from the plate member with a weight of 20 kg or less. Releasability was evaluated as poor (C) when the release plates were not released from the plate member with a weight of more than 20 kg.

(Test Results)

Here, combinations of a plate member including austenite-based stainless steel of the steel material No. 5 or a plate member including ferrite-based stainless steel of the steel material No. 6 and release plates each including any one of the stainless steels No. 1 to No. 9 were used to prepare 18 test assemblies. The 18 test assemblies were used to test high-temperature strength, thermal expansion coefficients, deformation suppressibility, and releasability. Test results are shown in Table 2. For deformation suppressibility and releasability, tests were performed with two patterns of heating and cooling each using three test assemblies. Deformation suppressibility was evaluated based on the average value of the amounts of deformation from three assemblies. Releasability was evaluated based on the average of results from three assemblies.

TABLE 2

| | Release plate Steel material No. | Plate material Steel material No. | Content of Si in steel material of release plate (mass %) | Ratio of high-temperature strengths (Fr/Fp) | Cooling rate | | | |
|---|---|---|---|---|---|---|---|---|
| | | | | | 3.2° C./min | | 1.1° C./min | |
| | | | | | Deformation suppressability | Releasability | Deformation suppressibility | Releasability |
| Present inventive examples 1 | 1 | 5 | 1.66 | 1.34 | B | A | A | A |
| Present inventive examples 2 | 2 | | 3.22 | 1.06 | B | A | A | A |
| Present inventive examples 3 | 3 | | 2.12 | 1.19 | B | A | A | A |
| Comparative Example 1 | 4 | 5 | 1.38 | 1.25 | B | C | B | B |
| Comparative Example 2 | 5 | | 0.60 | 1.00 | B | C | B | C |
| Comparative Example 3 | 6 | | 0.31 | 0.38 | C | C | C | C |
| Comparative Example 4 | 7 | | 0.92 | 0.31 | C | C | C | C |
| Comparative Example 5 | 8 | | 0.32 | 0.34 | C | C | C | C |
| Comparative Example 6 | 9 | | 0.56 | 0.25 | C | C | C | C |

TABLE 2-continued

| Release plate | Plate material | Content of Si in steel material of release plate (mass %) | Ratio of high-temperature strengths (Fr/Fp) | Cooling rate | | | |
|---|---|---|---|---|---|---|---|
| | | | | 3.2° C./min | | 1.1° C./min | |
| Steel material No. | Steel material No. | | | Deformation suppressability | Releasability | Deformation suppressibility | Releasability |
| Present inventive examples 4 | 1 | 6 | 1.66 | 3.58 | B | A | A | A |
| Present inventive examples 5 | 2 | | 3.22 | 2.83 | B | A | A | A |
| Present inventive examples 6 | 3 | | 2.12 | 3.17 | B | A | A | A |
| Comparative Example 7 | 4 | 6 | 1.38 | 3.33 | B | C | B | B |
| Comparative Example 8 | 5 | | 0.60 | 2.67 | B | C | B | C |
| Comparative Example 9 | 6 | | 0.31 | 1.00 | B | C | B | C |
| Present inventive examples 10 | 7 | | 0.92 | 0.83 | C | C | C | B |
| Present inventive examples 11 | 8 | | 0.32 | 0.92 | B | C | B | C |
| Present inventive examples 12 | 9 | | 0.56 | 0.67 | C | C | C | B |

Underlined numbers indicate that they are outside the range according to the present invention.

In Examples 1 to 6 according to the present invention, test assemblies having release plates including any one of the steel materials No. 1 to No. 3 were diffusion bonded. The amount of deformation after diffusion bonding was in a range of 50 μm or less, i.e., good (A) or fair (B) for all of the cases, demonstrating that diffusion-bonded articles with suppressed deformation were obtained. Specific combinations of bonding members and release plates according to the present invention can presumably promote adequate progress of thermal expansion and contraction due to heating and cooling during diffusion bonding treatment, leading to suppression of deformation.

Further, with regard to releasability of Examples 1 to 6 according to the present invention, the release plates were released from the plate members with small tensile force. When the combinations of bonding members and release plates according to the present invention were used, the release plates were able to be easily removed from the bonding members after diffusion bonding. Si oxide films formed on the surfaces of the release plates presumably inhibited interface reactions between the bonding members and the release plates, leading to suppressed adhesion of these materials and thus leading to improved releasability.

Further, when results from the cases where the average cooling rate was 3.2° C./min (Pattern A) were compared with those from the cases where the average cooling rate was 1.1° C./min (Pattern B) in Examples 1 to 6 according to embodiments of the present invention, the test assemblies cooled with Pattern B, i.e., with a smaller average cooling rate, showed improved deformation suppressibility as compared with those cooled with Pattern A. A smaller cooling rate may presumably reduce the extent of thermal contractive changes and accumulation of strain, leading to suppression of deformation.

On the other hand, Comparative Examples 1 to 12 used release plates of the steel materials No. 4 to No. 9. In Comparative Examples 1 to 12, the Si content of the steel material in the release plates was less than 1.5 mass %, which is outside the range defined according to the present invention. For all of the cases, releasability was slightly poor (B) or poor (C), and release after diffusion bonding was difficult.

Furthermore, in Comparative Examples 3 to 6, 10, and 12 where the ratio of high-temperature strengths was less than 0.9, deformation after diffusion bonding was significant, resulting in poor (C) deformation suppressibility after diffusion bonding.

These test results show that use of a combination of bonding members and release members for diffusion bonding, the release members including a steel material containing 1.5 mass % or more of Si, the ratio (Fr/Fp) of the high-temperature strength (Fr) of the release members at 1000° C. to the high-temperature strength (Fp) of the bonding members at 1000° C. being 0.9 or more, enables a method of manufacturing a heat exchanger in which even when the bonding members include stainless steel plates, deformation of the bonding members is suppressed while maintaining diffusion bonding properties, and releasability (detachability of a bonding member from a release member) after diffusion bonding treatment is excellent.

EXPLANATION OF REFERENCE NUMERALS

1 Plate member (bonding member)
2 Plate laminate
3 Release member
4 Holding jig
5 Pressurizing shaft
11a, 11b, 11c, 11d Plate member
13 Release plate
14 Test assembly
15 Holding jig 16 Cavity portion
17 Height (amount of deformation)
21 Plate member
23 Release plate
24 Test assembly
25 Suction cup
26 Wire
27 Weight

The invention claimed is:

1. A method of manufacturing a heat exchanger, the method comprising layering a plurality of bonding members made of stainless steel, and applying heat and pressure to effect diffusion bonding of the bonding members,
   wherein release members are arranged on both surface sides of the bonding members, and holding jigs are arranged so as to sandwich the bonding members through the release members, and pressing is then performed through the holding jigs with a pressure device, and
   wherein the diffusion bonding is performed using a combination of the release members and the bonding members, the release members including a steel material containing 1.5 mass % or more of Si, and
   a ratio (Fr/Fp) of high-temperature strength (Fr) of the release members at 1000° C. to high-temperature strength (Fp) of the bonding members at 1000° C. being 0.9 or more.

2. The method of manufacturing a heat exchanger according to claim 1, wherein an average cooling rate after heating in the diffusion bonding is less than 1.2° C./min.

3. The method of manufacturing a heat exchanger according to claim 1, wherein the holding jigs include a carbon material.

4. The method of manufacturing a heat exchanger according to, wherein a parting agent is applied to both sides of the release members.

5. The method of manufacturing a heat exchanger according to claim 2, wherein the holding jigs include a carbon material.

6. The method of manufacturing a heat exchanger according to claim 2, wherein a parting agent is applied to both sides of the release members.

7. The method of manufacturing a heat exchanger according to claim 3, wherein a parting agent is applied to both sides of the release members.

8. The method of manufacturing a heat exchanger according to claim 5, wherein a parting agent is applied to both sides of the release members.

* * * * *